(12) United States Patent
Larson

(10) Patent No.: US 8,603,613 B2
(45) Date of Patent: Dec. 10, 2013

(54) SYSTEM AND METHOD FOR COLOR-CHANGING DECORATIVE CONSTRUCTION MATERIALS

(75) Inventor: Erik Larson, Newton Centre, MA (US)

(73) Assignee: Tesserae Technologies, Newton, MA (US)

( * ) Notice: Subject to any disclaimer, the term of this patent is extended or adjusted under 35 U.S.C. 154(b) by 234 days.

(21) Appl. No.: 12/605,270

(22) Filed: Oct. 23, 2009

(65) Prior Publication Data

US 2010/0040844 A1 Feb. 18, 2010

Related U.S. Application Data

(63) Continuation of application No. PCT/US2008/005396, filed on Apr. 25, 2008.

(60) Provisional application No. 60/926,099, filed on Apr. 25, 2007.

(51) Int. Cl.
*B32B 3/00* (2006.01)

(52) U.S. Cl.
USPC ........ 428/204; 428/195.1; 428/201; 428/203; 52/311.1

(58) Field of Classification Search
USPC .............. 428/195.1, 201, 203, 204; 52/311.1
See application file for complete search history.

(56) References Cited

U.S. PATENT DOCUMENTS

| | | | |
|---|---|---|---|
| 4,749,260 A * | 6/1988 | Yang et al. | 359/275 |
| 4,893,906 A | 1/1990 | Makow | |
| 5,114,218 A | 5/1992 | Black et al. | |
| 5,686,979 A | 11/1997 | Weber et al. | |
| 5,762,823 A | 6/1998 | Hikmet | |
| 6,373,618 B1 | 4/2002 | Agrawal et al. | |
| 6,639,578 B1 | 10/2003 | Comiskey | |
| 6,680,792 B2 | 1/2004 | Miles | |

(Continued)

FOREIGN PATENT DOCUMENTS

| | | |
|---|---|---|
| DE | 10 2005036869 A1 | 2/2007 |
| WO | WO 03/026883 A1 | 4/2003 |

OTHER PUBLICATIONS

International Search Report and Written Opinion from corresponding PCT application No. US2008/005396 filed Apr. 25, 2008.

*Primary Examiner* — Mark Ruthkosky
*Assistant Examiner* — Christopher Polley
(74) *Attorney, Agent, or Firm* — Wolf, Greenfield & Sacks, P.C.

(57) ABSTRACT

A system and method for decorative elements having multiple visual appearances. The decorative elements may present different colors and/or other visual appearance characteristics and yet function as a durable construction material, like a traditional brick, tile or shingle. The decorative elements may receive a mechanical operation that permanently physically alters the decorative element, such as a cutting, sawing, drilling or molding operation, while the decorative element is functional to provide a controllable visual appearance both before and after the physical alteration. The decorative elements may be autonomous in that power needed to change visual appearance states can be gathered by an integrated energy harvesting device, such as a solar cell. A color chip system may be used to select decorative element features.

20 Claims, 15 Drawing Sheets

(56) References Cited

U.S. PATENT DOCUMENTS

| | | |
|---|---|---|
| 6,731,351 B2 | 5/2004 | Platz et al. |
| 6,902,454 B1 | 6/2005 | Petruchik |
| 6,917,301 B2 | 7/2005 | Blum et al. |
| 6,963,435 B2 * | 11/2005 | Mallya et al. ............ 359/238 |
| 6,982,178 B2 | 1/2006 | LeCain |
| 2004/0201878 A1 | 10/2004 | Agrawal et al. |
| 2005/0064175 A1 * | 3/2005 | Azari et al. ............ 428/321.5 |
| 2005/0233125 A1 | 10/2005 | Anderson et al. |

* cited by examiner

SYSTEM AND METHOD FOR COLOR-CHANGING DECORATIVE CONSTRUCTION MATERIALS

This application is a continuation of PCT International application PCT/US2008/005396, filed Apr. 25, 2008, and claims the benefit of U.S. Provisional application 60/926,099, filed Apr. 25, 2007.

BACKGROUND

There has been significant innovation in the field of passive decorative construction materials that act on ambient light in interesting ways. Chief among these are panel systems that have a range of materials embedded in transparent, translucent, or opaque sheets, e.g., sheet of glass used as room partitions. The companies involved in this field include 3form and Lightblocks. The types of materials that may be embedded in such sheets include both discrete pieces (e.g., wires, grass, leaves, flowers, pebbles, etc.) as well continuous films that add color and/or graphics. Further, these products may include a range of surface treatments, such as embossed patterns, grooves, specular finishes, matte finishes and anti-reflective coatings, among others. While some of these materials can create novel effects (like dichroic films whose apparent color shifts with view angle), there is no way to actively select or change the color characteristic or other visual appearance characteristic of the material after installation.

SUMMARY OF INVENTION

Aspects of the invention enable dynamic control of color or other visual appearance characteristics of various types of decorative elements used as a durable construction material. That is, decorative elements in accordance with aspects of the invention may be used as a visually active, durable construction material that has a controllable visual appearance, and may be employed alongside traditional passive, durable construction materials, such as tiles, bricks, shingles, etc. As used herein, a durable construction material is a material arranged to be used in constructing a building or other structure and be exposed to conditions normally experienced by building materials, such as bearing a compressive, shear and/or tensile load (such as that experienced by a tile, brick or beam), being exposed to abrasion or other physical contact (such as scuffing by shoes, scratching by fingernails, bumping by a chair, etc.), and/or being exposed to exterior environmental conditions (such as extreme cold or heat, intense sunlight, and so on). However, unlike traditional construction materials, a durable decorative element in accordance with aspects of the invention may be controlled to provide two or more visual appearances. Thus, for example, aspects of the invention provide for a floor covering exposed to pedestrian and other wear, such as a tile, or a countertop surface exposed to the weight of plates, glasses and other items, that is capable of exhibiting multiple, different colored appearances. The decorative element may consume no power when in a visual appearance state, e.g., may provide its visual appearance based on reflected and/or transmitted light. Power, e.g., electrical power, may be required only to change the decorative element's visual appearance between stable states.

In some embodiments, the decorative elements may be controlled to exhibit a visual appearance that closely matches the appearance of adjacent passive construction materials, such as standard bricks, stone, painted wall surfaces, tiles, etc. The decorative elements may provide a more convincing, matching appearance than light emitting displays (such as a plasma display panel), e.g., because of the use of reflected and/or transmitted light to create the visual appearance. For example, the decorative element may incorporate other features, such as passive aesthetic components, including surface features like scratches, grooves, a matte or gloss finish, etc., and/or embedded materials (natural or otherwise), to help provide a desired visual appearance. Thus, for example, a decorative element in accordance with aspects of the invention, may present a visual appearance that matches natural sandstone (or other natural materials) both in color and texture. However, in some modes, the decorative element may be controlled to exhibit a visual appearance that is very different from the sandstone or other material.

In one aspect of the invention, a building material having multiple selectable visual appearance capabilities includes at least one decorative element having at least one layer of light altering material arranged to selectively transmit, absorb and/or reflect light in a wavelength range, and at least upper and lower layers of covering material arranged to cover upper and lower sides of the at least one layer of light altering material. The upper and/or lower layer of covering material may include an electrode arranged to expose light altering material to an electric field and thereby control the light altering material to selectively transmit, absorb or reflect light in the wavelength range. First and second outer protective layers may be arranged over the upper and lower layers of covering material, and a controller may electrically communicate with the electrode and provide a control signal to the electrode to create the electric field and cause the light altering material to generate a component of a visual appearance in a display area, e.g., where the light altering material is visible on the decorative element. In accordance with this aspect of the invention, the decorative element is arranged to function as an exposed durable construction material, e.g., so that the decorative element may be deployed as (or as part of) a brick, tile, shingle, banner, window glazing, stair tread, table top, seating surface, window or door casing or other molding, and so on.

In one embodiment, the decorative element is an exposed durable construction material for a floor, wall, stair, ceiling, curtain wall system, counter, chair or table. The decorative element may include a passive aesthetic component permanently arranged with one of the outer protective layers or fixed between the outer protective layers so that the passive aesthetic component is visible from at least one side of the decorative element. Thus, the controller may be arranged to provide suitable control signals so that the decorative element creates a corresponding visual appearance that includes visual components provided by the passive aesthetic component and the light altering material. The passive aesthetic component may include grooves, cuts, embossing, etching, printed images or embedded materials in a surface of an outer protective layer. Embedded materials may include wire, grass, wood, twigs, leaves, flowers, shells, rocks or fibers, and the passive aesthetic component(s) may mask an electrical interconnection to an electrode or other component in the decorative element.

In one embodiment, the decorative element may be controlled to provide a visual appearance that mimics a surface of an adjacent passive construction material, such as a metal surface, a wood surface, a plastic surface, a stone surface, a tile surface or a glass surface. The visual appearance may be visually similar both from color perspective and a texture, or surface finish, perspective, e.g., a gloss finish that is similar to a glossy paint on an adjacent metal panel. The decorative element may also be controlled to produce a visual appearance that is distinct from the adjacent passive construction material. Thus, a decorative element may initially provide a glossy, red visual appearance that matches an adjacent painted metal panel (such as on a vehicle), and then be controlled to present a contrasting visual appearance, such as a glossy white.

In another aspect of the invention, a decorative element may have the layer of light altering material, the layers of covering material and the protective layers arranged to allow permanent physical alteration of one or more portions of the layers by mechanical operation so that the decorative element is functional to provide a controllable visual appearance before and after the physical alteration of one or more portions of the layers. The mechanical operation may include drilling, cutting, molding or other operations that cause the layers to take on a different, permanent physical shape. Thus, for example, a user may be able to purchase a decorative element and then customize the physical shape of the element for a particular application by cutting, drilling, molding, etc.

In another aspect of the invention, a decorative element assembly includes a decorative element with an energy harvesting device and energy storage device, so that the assembly is arranged to allow operation without physical connection for power or control. The energy harvesting device may be a solar power device that receives illumination transmitted through the light altering material, the covering material and a protective layer, so that the solar power device receives illumination only transmitted through a display area, e.g., an area where the light altering material has an affect on incident light. In this way, the solar power device may made as unobtrusive as possible. Of course, in other embodiments, the solar power device or other energy harvesting device may be arranged to receive light in the display area and/or other areas. The assembly may include a sensor, such as a motion sensor, time of day sensor, rain sensor, etc., and the controller may control the visual appearance of the decorative element based on the sensed condition.

In another aspect of the invention, a decorative element system may include at least one decorative element having a controllable visual appearance, and a set of color chips, where each color chip includes a representation of a visual appearance of the decorative element in a corresponding mode. The controller may be constructed and arranged to control the light altering material to provide the visual appearance for a color chip in response to a corresponding control signal, e.g., so that the decorative element presents a visual appearance that closely matches, or matches, the visual appearance of the color chip. In accordance with this aspect of the invention, designers and other users of the decorative elements can touch, feel and see a physical sample of a decorative element's visual appearance, or range of visual appearances, when choosing how and where the decorative element should be deployed. The user can also custom design a decorative element to have a defined set of visual appearance modes, e.g., two or more visual appearances, and the controller may control the decorative element to selectively switch between modes at desired times, e.g., in response to detected conditions, such as a crowd of people, a time of day, and so on. This feature may be used before a decorative element is deployed, or after the decorative element is deployed (e.g., used in the construction of a building) so as to allow a user the ability to change the appearance(s) of the decorative element as desired, e.g., for different events, times of year, and so on.

These and other aspects of the invention will be appreciated from the following description and claims.

BRIEF DESCRIPTION OF THE DRAWINGS

Aspects of the invention are described with reference to illustrative embodiments and the following drawings in which like numerals reference like elements, and wherein.

DETAILED DESCRIPTION

Figure 1:
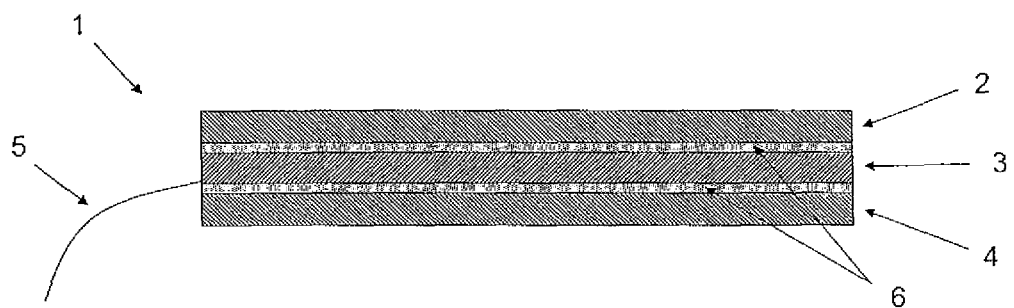
FIG. 1 shows a side view of a decorative element in an illustrative embodiment.

Aspects of the invention are described with reference to illustrative embodiments. However, it should be understood that aspects of the invention are not limited to the illustrative embodiments described. Instead, aspects of the invention may be implemented in any suitable way. For example, embodiments below employ a cholesteric liquid crystal material as a light altering material. However, aspects of the invention are not necessarily limited to the use of a cholesteric liquid crystal material. Also, aspects of the invention may be used alone and/or in any suitable combination with other aspects of the invention.

A. Decorative Element with Active Light Altering Material and Passive Features

In one aspect of the invention, a decorative element includes active, changeable light altering materials together with other components to create a robust decorative system that can be used like other construction materials. In these illustrative embodiments, the "light altering material" (LAM) has several key characteristics. First, the LAM acts on light from another source (e.g., sunlight or artificial lighting). Thus, the LAM is not a light emissive material. Second, the LAM can withstand substantial mechanical stress and physical deformation and yet maintain the ability to operate as intended. Third, the LAM is reasonably efficient in its light altering characteristic (i.e., may have a relatively high reflectivity and/or transmission) so that the visual appearance of the decorative element can be perceived under normal outdoor light conditions. There are several different types of material that may be used as a LAM in embodiments in accordance with aspects of the invention. One embodiment is a flexible encapsulated cholesteric liquid crystal (ChLC) material produced using the Polymerization Induced Phase Separation (PIPS) technique (developed by Kent Displays, Inc. and others). Other embodiments include: other encapsulated liquid crystal materials (in particular stacked Guest-Host types), encapsulated electrowetting devices and encapsulated opalescent photonic crystal devices. In order to be used practically, in many embodiments these typically somewhat delicate light altering materials must be protected and rendered into a standard form—usually a sheet. The individual LAM sections within a decorative element would typically be of moderate size—typically ranging from about 1×1 inches to 10's of inches along each of two dimension—although it is conceivable that very large sections measuring many feet on a side could be used. In one embodiment, the LAM is a liquid crystal material that does not require a polarizing element to function.

The element could contain a combination of light altering material section(s) along with fixed, passive aesthetic materials and treatments. Some of the fixed aesthetic materials could be embedded within the element, including both discrete pieces (wires, grass, leaves, flowers, pebbles, etc.) as well as films or other layers that add color and/or graphics. Further, a range of outer surface treatments could be employed, including: embossed patterns, grooves, specular finishes, matte finishes and anti-reflective coatings. Herein, these embedded materials and surface treatments are referred to as "passive aesthetic elements or components." (PAEC) This aspect of the invention enables dynamic control of color altering material sections of a decorative element while retaining the benefits of the passive aesthetic elements or components.

FIG. 1 shows a schematic view of a decorative element 1 in an illustrative embodiment. The decorative element 1 includes a light altering material layer 3, such as a cholesteric liquid crystal material having a thickness of about 10 microns, encased with upper and lower covering material layer(s) 6. These covering material layers 6 may be made of any suitable material or materials, such as polyethylene terephthalate (PET), and have any suitable thickness, such as 25 microns. Although not shown, at least one covering material layer 6 includes one or more electrodes to provide a control signal to the light altering material layer 3, so as to change the optical properties of the light altering material 3, e.g., to reflect, absorb and/or transmit light of a specific wavelength or range of wavelengths. (By "including" an electrode, it is meant that the electrode may be arranged on and in contact with either side of the covering layer, above and out of contact with the covering layer, e.g., with an intervening adhesive or other layer, or within the covering layer.) The electrodes, associated leads and other control components may be connected to a controller (not shown) by an interconnection 5, such as one or more wires, conductive traces or other leads formed by printing, etc. The control of light altering materials is well known in the art and not discussed in detail herein. In this embodiment, the decorative element 1 also includes a front outer protective layer 2 and a rear outer protective layer 4. The protective layers 2 and 4 may be made of any suitable material or materials, such as polyethylene terephthalate (PET), and may have a thickness of several millimeters. The protective layers may be integrated with the covering layers, e.g., made together as a single sheet, if desired.

One illustrative method process for creating/assembling the layers of the decorative element 1 is as follows. It should be noted that the process may depend on which type of light altering material is used. The following steps assume that encapsulated cholesteric liquid crystal material produced using the Polymerization Induced Phase Separation (PIPS). Typically, a mixture of polymer and appropriate cholesteric liquid crystal materials are initially mixed in a highly controlled ratio—this ratio determines many of the device fabrication and operating parameters. This mixture is then pressed between two covering material layers using lamination equipment. Plastic spacer balls may be added to the mixture to set the initial thickness of the polymer/ChLC layer between the covering layers. The polymer is then typically polymerized using UV radiation. During this time, the ChLC materials form into droplets separated by the solidified polymer that forms an encapsulating matrix of sorts around the ChLC drops. The intensity and length of the UV exposure help to determine the characteristics of the encapsulation. In one method, additional light altering material layers may be fabricated by the same technique, but using different ChLC materials tuned to alter different regions of the visible spectrum (i.e. red, green, blue, etc.). If required, several different light altering materials may be laminated together using high quality adhesives and heat and/or pressure. At this point in the manufacturing process, the light altering material is effectively functional. To be made into a robust construction material, the outer protective layers are added (although it is possible for the protective layers to be combined with covering layers). Typically, the light altering material layer(s) are laminated to the front outer protective layer using pressure sensitive adhesive (PSA), which depending on the complexity and size may be done by hand or machine. The interface between the covering layer and protective layer, if present, is critical because the light altering properties must be transferred through the interface; so care must be taken to avoid particulates, air bubbles or other observable defects. At this stage, or optionally before, interconnections may be added to the element, e.g., at the rear side covering layer. After interconnections are complete, the rear outer protective layer(s) can be attached. The method for doing so depends on the desired properties for the decorative element: a thin, flexible layer may be laminated using PSA and rollers. However, a thicker, rigid layer may require specialized equipment like an industrial autoclave to bond the rigid components together.

The completed decorative element 1 may be deployed in a variety of applications, as discussed in more detail below. For example, the decorative element 1 may be applied as a skin or exposed layer to an underlying structural material or element, such as a table top, floor underlayment, vertical wall sheathing, and so on. Alternately, the decorative element 1 may be arranged provide a more structural role, e.g., as a brick, beam, tension panel, etc.

Figure 2:
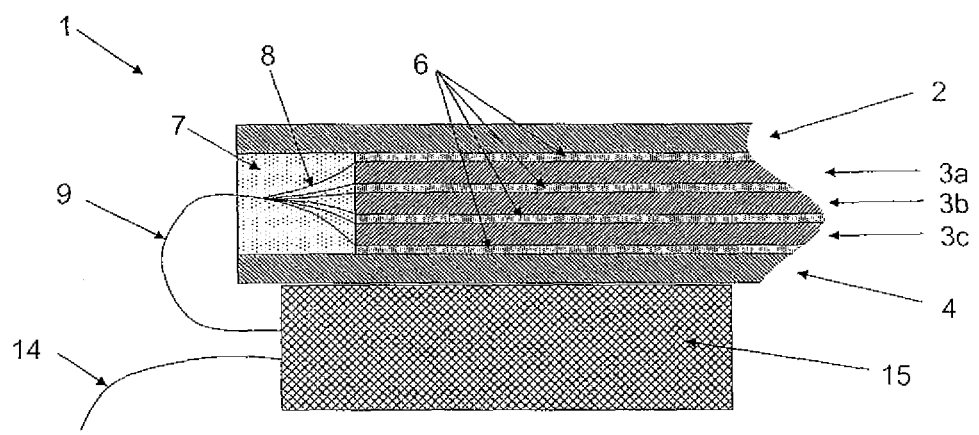
FIG. 2 shows a side view of a decorative element having multiple light altering layers in an illustrative embodiment.

FIG. 2 shows a schematic side view of a decorative element 1 constructed with multiple light altering layers 3a, 3b, 3c within covering material layers 6. In this embodiment, the light altering layers 3 are in a stacked configuration and may each alter a different portion of the visible spectrum. In one particular case, light altering layer 3a may affect the blue portion of the spectrum; light altering layer 3b may affect the green portion of the spectrum; and light altering layer 3c may affect the red portion of the spectrum. Thus, the element 1 may be able to provide differently colored visual appearances by the interaction of light reflected from and/or transmitted through the layers 3. This assembly is further encased by a front outer protective layer 2 and a rear outer protective layer 4. The light altering material layers 3a, 3b, 3c are electrically connected to a element controller 15 by interconnections 8, 9. More specifically, interconnection 8 connects the electrodes that expose each light altering layer to an electric field to interconnection 9 that in turn connects to controller 15. In one embodiment, an adhesive 7 may be used to secure the interconnection 8, 9 as well as seal the edge of the element 1. (Adhesive may be used to bond covering layers 6 together as well, if needed. For example, each light altering layer 3 may be assembled with top and bottom covering layers 6 to form an encapsulated light altering layer 3. The encapsulated light altering layers 3 may then be joined together, e.g., by adhesively bonding adjacent covering layers 6 for the light altering layers to form the laminated structure shown in FIG. 2. Thus, although adhesive is not shown in various embodiments for assembling the light altering layers 3, the use of adhesives or other bonding techniques is possible.) Additionally, the element controller 15 may be connected to a higher level system control (that may include a power supply) using interconnection 14. The higher level system control (not shown) may therefore provide power to the element controller 15 as well as provide control signals used by the element controller 15 to change the properties of the light altering material 3 to cause the decorative element 1 to provide a desired visual appearance. The element controller 15 may be a custom ChLC driver and controller with the ability to drive large "pixel" areas from Kent Displays, Inc., and the higher level system control may be a Sunlite Easy Stand Alone DMX controller by Nicolaudie.

As is known, the light altering material may be changed in state to provide different visual appearances for the decorative element 1 by exposing the light altering material to different electric fields. The electrodes used to provide the electric field(s) may have any suitable size and/or shape, and in some cases a single decorative element 1 may have only one electrode on either side of the light altering material so that all of the light altering material in the decorative element is changed in state based on a single control signal. In other embodiments, the decorative element may have several electrodes, but in general, the pixel area for each electrode will be relatively large, e.g., 1×1 inches or larger. Thus, it is possible for a decorative element (and/or an array of two or more decorative elements with suitable, coordinated control) to present a visual appearance that varies across different areas of the light altering material, e.g., to display text, logos or other similar information.

Figure 3:
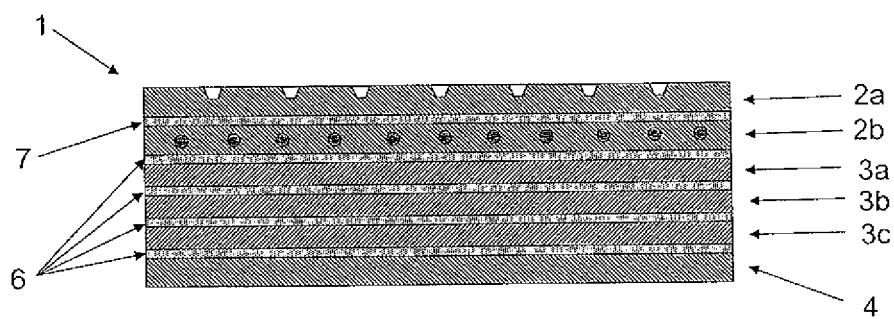
FIG. 3 shows a side view of a decorative element having multiple light altering layers and passive aesthetic elements in an illustrative embodiment.

Passive aesthetic components may be combined with a decorative element in any suitable way to provide desired visual appearance characteristics. FIG. 3 shows a section of a decorative element 1 constructed with multiple light altering layers 3a, 3b, 3c within covering material layers 6, and front outer protective layers 2a, 2b and a rear outer protective layer 4. (Although the term "protective" is used to refer to the layers 2a and 2b, it is not required that both layers provide a protection function for the element 1. Instead, only one layer, such as layer 2a, may provide a protection role, and the other layer, layer 2b, may operate as an aesthetic component.) In this embodiment, the front outer protective layers 2a, 2b include one or more passive aesthetic elements or components. In particular, the front outer protective layer 2a is shown with grooves in its outer surface to create a specific aesthetic effect, e.g., possibly a lenticular lens effect. Further, the front outer protective layer 2b is shown with element embedded within it to create a specific aesthetic effect. As discussed above, passive aesthetic elements embedded in a decorative element (whether in or on the surface of the protective layers or positioned entirely within the protective layers) may be any suitable material, such as leaves, wire, stones, jewels, paper, photographs, etc. An adhesive 7, thermal welding, or other techniques/materials may be used to bond the layers of the element 1 together as well as secure passive aesthetic components to the protective layer(s). Alternately, passive aesthetic elements may be molded into the protective layer(s), such as that shown in the layer 2b, or otherwise associated with the protective layer(s) in any suitable way. The passive aesthetic elements maybe visible from one or both sides of the decorative element 1, and thus may contribute to an overall visual appearance of the decorative element 1 together with the light altering material 3.

Figure 4:
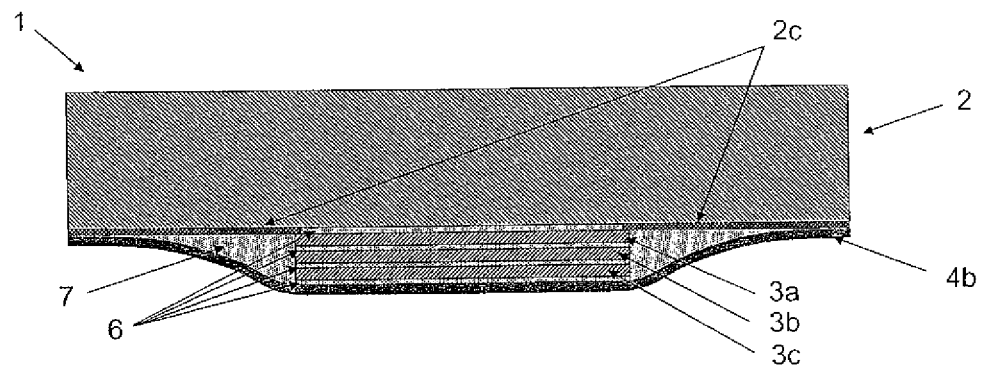
FIG. 4 shows a side view of a decorative element in which a protective layer includes a masking element in an illustrative embodiment.

Passive aesthetic components may be employed to hide or otherwise mask portions of the light altering layers and/or other portions of the element 1 and provide a desired visual appearance. FIG. 4 shows a section of a decorative element 1 constructed with multiple light altering layers 3a, 3b, 3c within covering material layers 6 and a front outer protective layer 2 and a rear outer protective layer 4b. In this embodiment, front outer protective layer 2 is relatively thick (and possibly rigid) while rear outer protective layer 4b is relatively thin and flexible. Additionally, the light altering material layers 3a, 3b, 3c are shown in a limited region within the larger outer protective layers 2, 4b. An outer protective layer 2c has been printed (or otherwise applied) onto front outer protective layer 2 so as to be generally present in the regions of the element 1 not within light altering material region (or display area—an area of visual presentation where the light altering material has an affect on light). There may be a slight overlap between outer protective layer 2c and the light altering material region to cover any irregularity that might occur at the edges of the light altering material layers 3a, 3b, 3c. An adhesive 7 and/or other techniques or materials may be used to bond the layers of the element 1 together.

Figure 5:
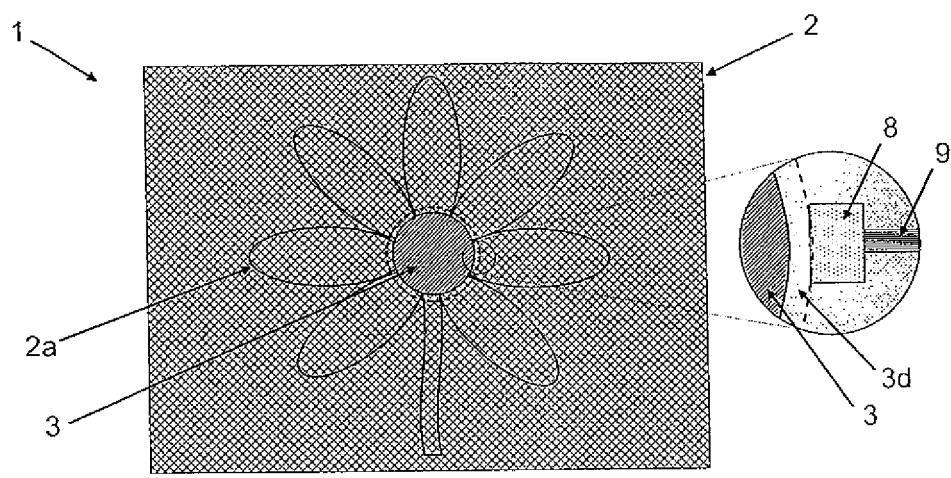
FIG. 5 shows a front view of the FIG. 4 embodiment.

FIG. 5 is a front (observer's) side view of the FIG. 4 embodiment, showing that the light altering layer 3 is visually exposed within a limited region or display area. In this embodiment, the outer protective layer 2c (that shows the image of a flower) has been printed (or otherwise applied) onto front outer protective layer 2 and functions as a masking element, e.g., so as to generally cover the regions of the element 1 not within light altering material region. In this way, as the light altering materials change colors, the center of the flower will appear to change color. Of course, the front outer protective layer 2 may more substantially overlap the light altering material region, if desired. There is an overlapping region 3d between outer protective layer 2c and the light altering material region that is shown in the magnified inset drawing. The light altering material region that is exposed for viewing, i.e., that contributes to the visual appearance, is referred to as the display area. As noted previously, this overlap region 3d may be used to cover any irregularities that might occur at the edges of the light altering material layer 3. The larger printed region 2c may be used to mask any necessary electrical connections 8, 9. These connections may include interconnection 8 that connects the electrodes that expose each light altering layer to an electric field to interconnection 9 that in turn connects to a controller (not shown).

Figure 6:
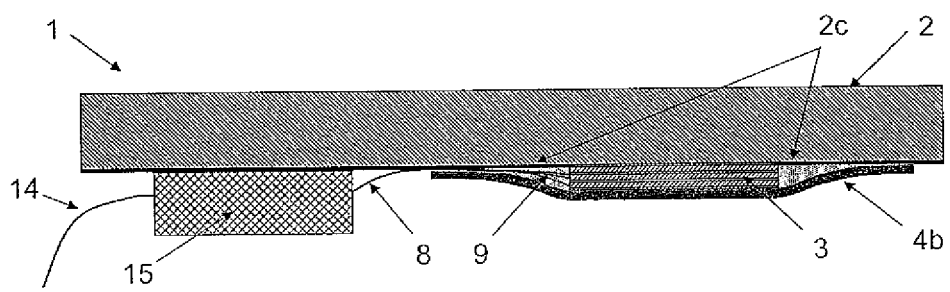
FIG. 6 shows a side view of a decorative element in which a protective layer includes a masking element that covers electrical interconnections in an illustrative embodiment.

FIG. 6 shows a section of a decorative element 1 constructed with light altering material layers 3 within a limited region within the larger front outer protective layers 2, e.g., like that in FIGS. 4 and 5. This assembly is further encased by a front outer protective layer 2 and a rear outer protective layer 4b. In this embodiment, front outer protective layer 2 is relatively thick (and possibly rigid) while rear outer protective layer 4b is relatively thin and flexible. An outer protective layer 2c has been printed (or otherwise applied) onto front outer protective layer 2 so as to generally cover the regions of the element 1 not within light altering material region. This embodiment shows how the printed outer protective layer 2c may be used to mask interconnections 8, 9 as well as controller 15 that is shown attached to the rear of the element 1. This particular case also shows how rear outer protective layer(s) 4b may be selectively applied over the region(s) with light altering materials (as opposed to the entire area of the element). Additionally, the element controller 15 may be connected to a higher level system control (that may include a power supply) using interconnection 14.

B. Element with Ability to Blend with Adjacent Passive Materials—Stealth

Another aspect of the invention is the capability to use the dynamic color control feature of a decorative element to "blend in" with adjacent materials. In this way, the decorative elements could adopt a kind of "stealth" mode. This might be accomplished by directly matching in color the material bordering the dynamic region thus visually blurring the border between the two. Alternatively, the dynamic regions could follow a pattern (like a series of colored stripes) established across a larger installation of elements thus "fitting into" the pattern. Then, the dynamic section(s) could "emerge" from this "stealth" mode by changing its color characteristic. This could be done quickly—for "shock" value—or more slowly for a subtle effect. This could give designers a new type of control over tangible objects.

Figure 7:
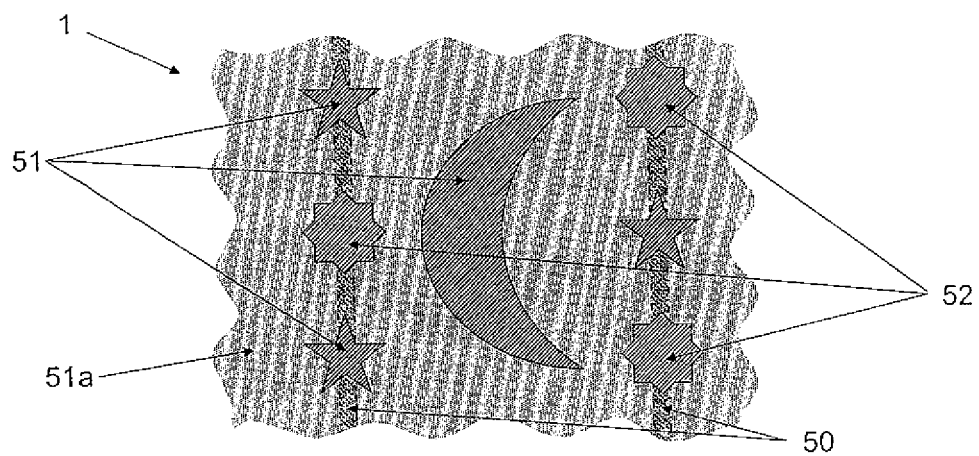
FIG. 7 shows a top view of multiple decorative elements arranged in a tile array with other passive construction materials.

FIG. 7 shows a front (observer's) side view of an embodiment of a decorative element 1 in the form of a portion of a terrazzo floor. Dynamic light altering material regions (or display areas) 52 are shown set within a larger field of passive material regions 51a that is further decorated by contrasting traditional decoratively shaped inset regions 51. The regions 51a and 51 may be formed by paint, a solid plastic, tile, and/or any other suitable material. Additionally, interconnections 50 between the display areas 52 and a control system (not shown) are shown as hidden beneath the opaque surface of the passive material regions 51a. The "stealth" effect could be accomplished in this case by first having the control system set the appearance of the dynamic light altering material regions 52 to match that of the larger field of passive material 51a. This could cause the light altering material regions 52 to blend together visually and effectively "disappear." Then, the control system could change the appearance of the dynamic regions 52, thus causing them to "appear" again, possibly in a fashion aesthetically coordinated with the traditional regions 51.

Figure 8:
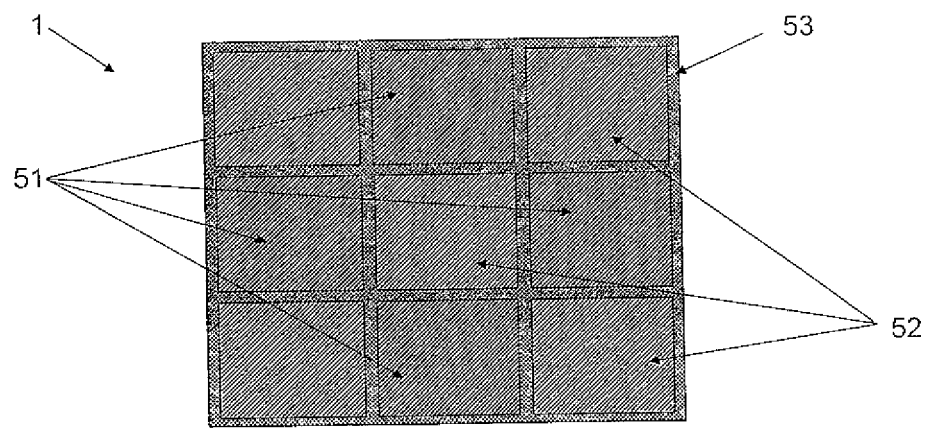
FIG. 8 shows multiple decorative elements arranged as glazing in a window.

FIG. 8 shows an observer's side view of an embodiment of a decorative element 1 in the form of a window sash. In this particular case, it is imagined that the element 1 works in a transmissive mode with an ambient light source on the side opposite the observer (possibly the sun outside the building in which the window is installed). Light altering material display areas 52 are shown as panes set within a window frame 53 along with traditional glass panes 51 that may or may not be colored or otherwise adorned. The operation of the "stealth" effect could be similar to the preceding case in FIG. 7. However, in this case, the visual appearance of the decorative element 1 would be accomplished using transmitted light.

C. Element used as Durable Construction Material

In one aspect of the invention, a decorative element may serve as a durable construction material (DCM) in a variety of applications. In a general sense, this is in strong contrast to the type of special treatments that must be used to install traditional display technologies in a public space or high traffic area. These relatively fragile components (like plasma or backlit LCD screens) must typically be mounted with specialized hardware and, if they are accessible to touch or other contact, further enclosed in protective casings. The implicit goal of this aspect of the invention is to create a decorative element much more akin to a sheet of plywood or other construction material than a plasma display.

There are two important features of an embodiment in accordance with this aspect of the invention that allow a decorative element to serve as a durable construction material. First, it is able to bear a functional load and yet retain its ability to operate as intended. Such a load could be substantially in excess of that required to support itself, and may be a dynamic load and/or a static load. Depending on the configuration of the layers of the decorative element, the load could be compressive, shear, tensile or some combination. This property will allow the decorative element to be used to construct a wide variety of objects, furnishings, and structures. Additionally, it will also be able to withstand (during operation) the bumps, scrapes, and impacts of everyday use in a high traffic environment. Thus, a decorative element in this aspect of the invention may be exposed to, and withstand such that visual appearance functionality is maintained, conditions normally experienced by building materials, such as bearing a compressive, shear and/or tensile load (such as that experienced by a tile, brick or beam), being exposed to abrasion or other physical contact (such as scuffing by shoes, scratching by fingernails, bumping by a chair, etc.), and/or being exposed to exterior environmental conditions (such as extreme cold or heat, intense sunlight, and so on).

The second feature is the decorative element's ability to take the form of, or be integrated with, a variety of traditional construction components. These forms include: floor tiling, wall cladding/siding, shingling, wall tiling, bricks, and molding (e.g., door and window casings, chair rails, baseboard, etc.). In this way, decorative elements could be installed using similar (perhaps nearly identical) techniques to that of its traditional construction material analog. This property could also help to enhance the blending/stealth property mentioned earlier by allowing the outward form to also serve as a type of camouflage, if desired. For example, several dynamic, decorative element bricks may be set among an entire wall of traditional bricks, all using the same joints and mortar.

This aspect of the invention may also tend to make installed decorative elements less susceptible to vandalism and/or theft. This may work in two or more ways. First, such elements may be installed in a way so that the elements are physically difficult to remove. Secondly, the elements may not be perceived like an expensive electronic component (i.e., like a plasma display screen hung in a locked steel frame at a bus shelter), but more like a standard paver, brick or shingle.

Figure 9:
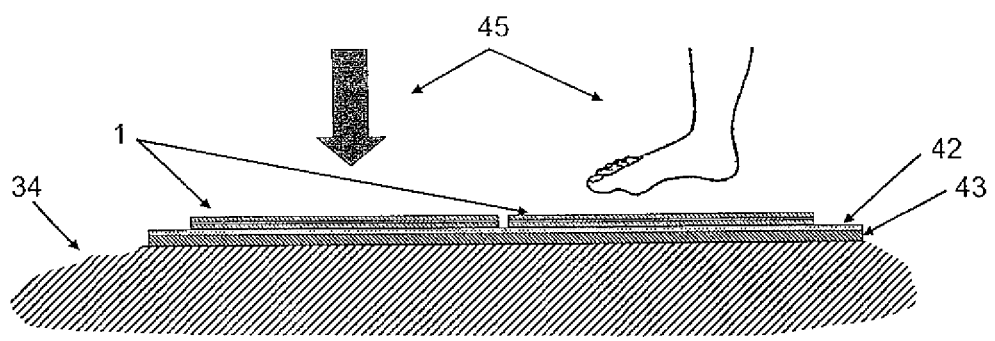
FIG. 9 shows multiple decorative elements deployed in a floor tile arrangement.

FIG. 9 shows one illustrative embodiment of a section of decorative elements 1 in the form of floor tiles. The elements 1 may be installed in typical manner for flooring with an adhesive 42 bonding the elements 1 to an underlayment layer 43 that is further attached to the floor 34. In such an embodiment, the elements 1 must be able to withstand the forces 45 associated with people walking on them and other conditions common to floors. In particular, high compressive loads may be generated by foot traffic (e.g., by high heeled shoes), furnishings, maintenance equipment, etc. Additionally, the elements 1 must hold up under the typical abrasion, cleaning and general wear and tear to which flooring is subjected.

Figure 10:
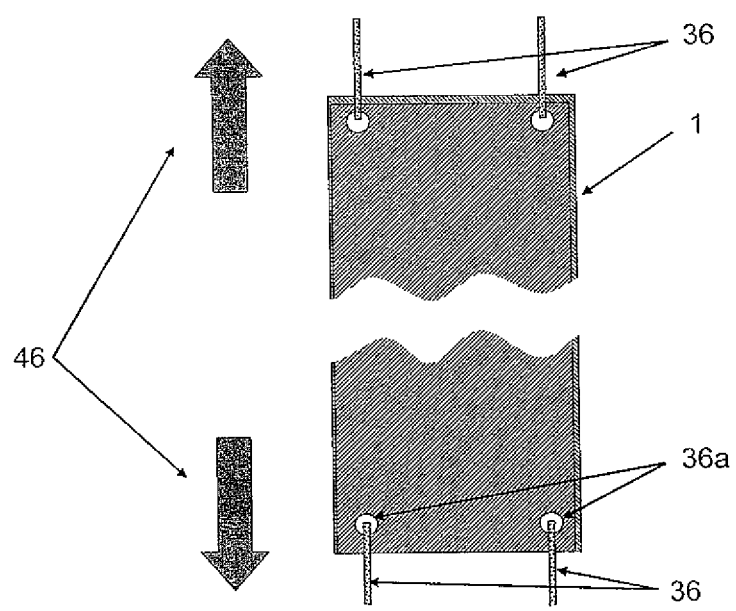
FIG. 10 shows a decorative element deployed as a banner.

FIG. 10 shows another illustrative embodiment of a decorative element 1 in the form of a banner. The element 1 may be installed in a typical manner for such a banner with cables 36 attached though holes 36a in the element 1. The banner element 1 may be held taut by tension placed on the cables from their attachment points to a wall, ceiling or other support (not shown). In such an embodiment, the element 1 must be able to withstand the substantial tensile forces 46 associated with such an arrangement. In this case, the element may also be subjected to additional forces, including wind loads if the element is an exposed environment.

Figure 11:
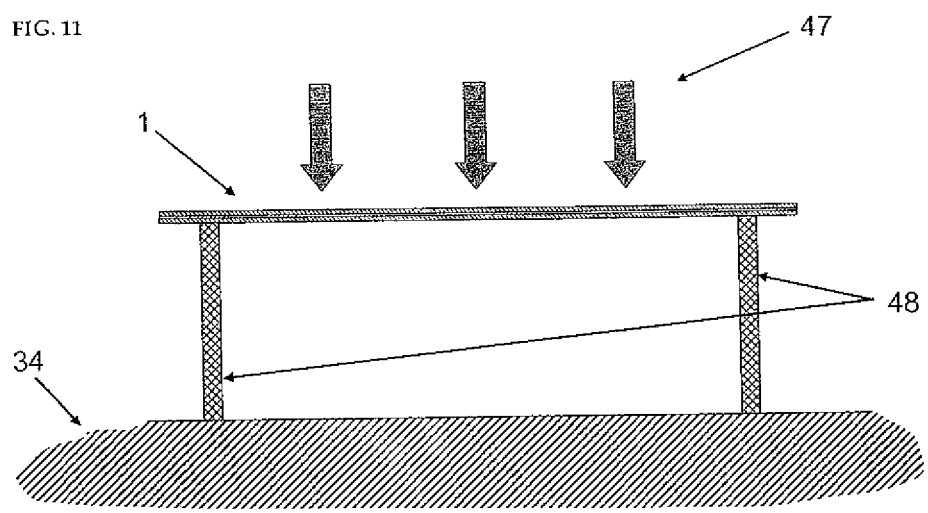
FIG. 11 shows a decorative element deployed as a table top.

FIG. 11 shows another embodiment in which a decorative element 1 functions as a table top surface. The element 1 is installed in typical manner for a table with legs 48 resting on the floor 34. In such an embodiment, the element 1 must be able to withstand the forces 47 associated with the use of a table. In particular, loads placed in the middle of the table may subject the element 1 to significant bending forces. Additionally, the element must hold up under the typical wear and tear to which a table is subjected. In another embodiment, the element 1 may be provided on the top surface of a traditional table, e.g., so that the element 1 need not provide the structural support for the table top and objects placed on the table, but rather provides only the top surface of the table with structural support being supplied by another member, such as a sheet of plywood.

Figure 12:
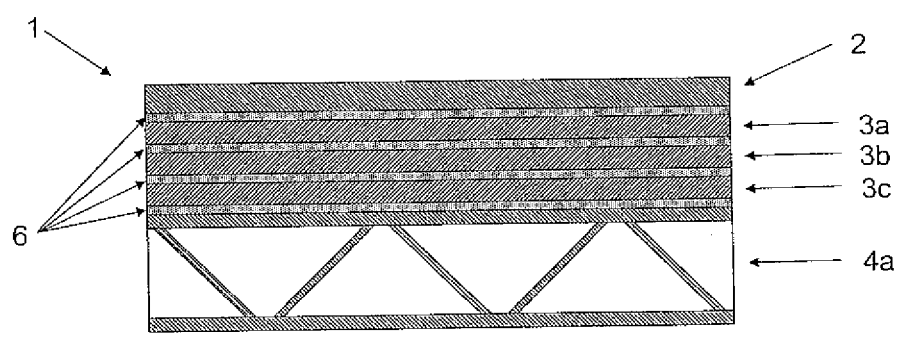
FIG. 12 shows a side view of a decorative element having an integrated structural member.

FIG. 12 shows a sectional view of a decorative element 1 constructed with multiple light altering layers 3a, 3b, 3c within covering material layers 6. This assembly is further encased by a front outer protective layer 2 and a rear outer protective layer 4a. In this embodiment, the rear outer protective layer 4a has a special profile designed to enhance its structural properties. The choice of outer layers with such properties could greatly increase an element's ability to withstand particular forces likely to be encountered in operation as a durable construction material. In this case shown, the profile of the rear outer protective layer 4a may enable the table top element of FIG. 11 withstand the bending forces it is likely to encounter.

Figure 13:
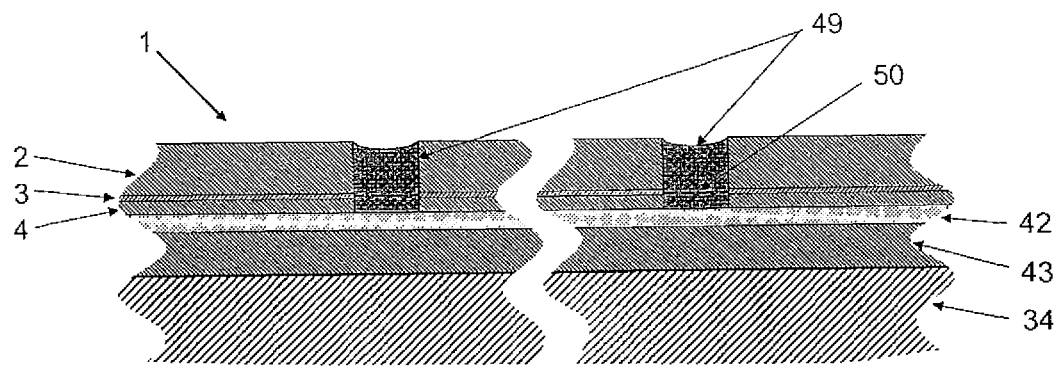
FIG. 13 shows a sectional view of floor tile-type decorative elements with a grout-like material located between elements.

FIG. 13 shows a section view of another embodiment in which decorative elements 1 are arranged as floor tiles. The elements 1 are installed in typical manner for flooring with an adhesive 42 bonding them to an underlayment layer 43 that is further attached to the floor 34. The tile elements 1 are created by encasing a light altering material layer 3 with a front outer protective layer 2 and a rear outer protective layer 4 that is bonded to the floor 34 as described. In this case, the form and appearance of traditional floor tiles could be closely mimicked by the elements, including a grout like material 49 placed between them. The required interconnections 50 could be effectively hidden by the grout material 49.

Figure 14:
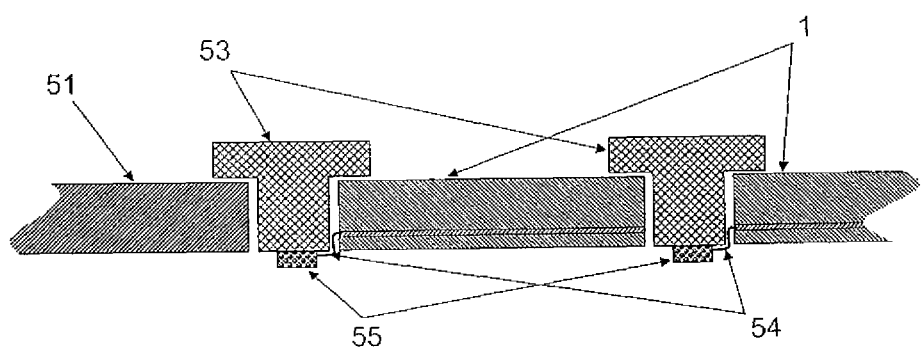
FIG. 14 shows window pane-type decorative elements with a mullion or other separator element between elements.

FIG. 14 shows a section view of another embodiment in which decorative elements 1 are arranged in the form of window panes. The elements are installed in typical manner for windows with divided lights within a frame 53 (e.g., mullions) that may also hold traditional panes 51. In this case, the form and appearance of traditional panes could be closely mimicked by hiding the required interconnections 54 behind the flange section of the frame 53. Depending on the configuration, it is possible that specially designed controllers 55 could also be hidden by the frame 53. Alternatively, additional interconnections could be run along the frame to an area where a controller (not shown) may be located.

Figure 15:
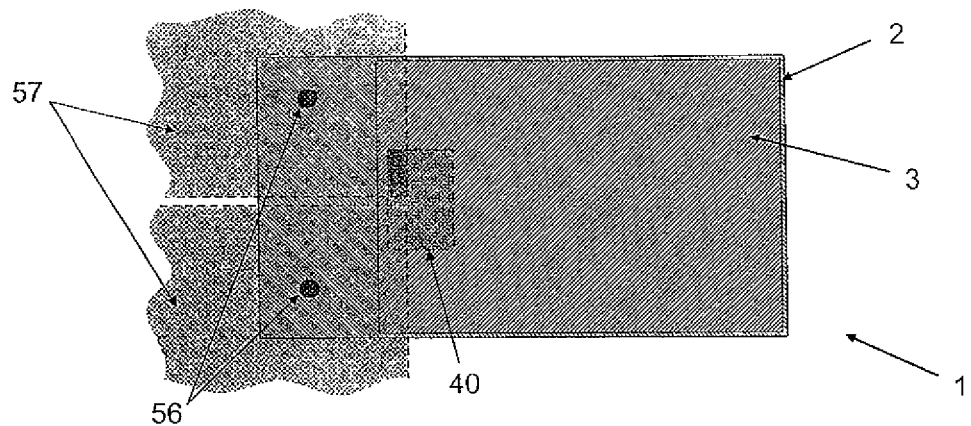
FIG. 15 shows a top view of a decorative element deployed in a shingle configuration.

FIG. 15 shows another embodiment in which a decorative element 1 is arranged in the form of a shingle. The element is installed in a typical manner for shingling with a mechanical fastener 56 (such as a nail) attaching to the underlying surface (e.g., traditional sheathing). The shingle element 1 is created by encasing a light altering material layer 3 within outer protective layers 2 (with the covering layers being integrated with the protective layers). In this case, the form and appearance of a traditional shingle could be closely mimicked by the element being applied among other traditional shingles 57. Note that the light altering region 3 need not extend under the area covered by the topping shingles 57. Additionally, the controller 40 could be hidden in the area beneath the shingle element.

Figure 16:
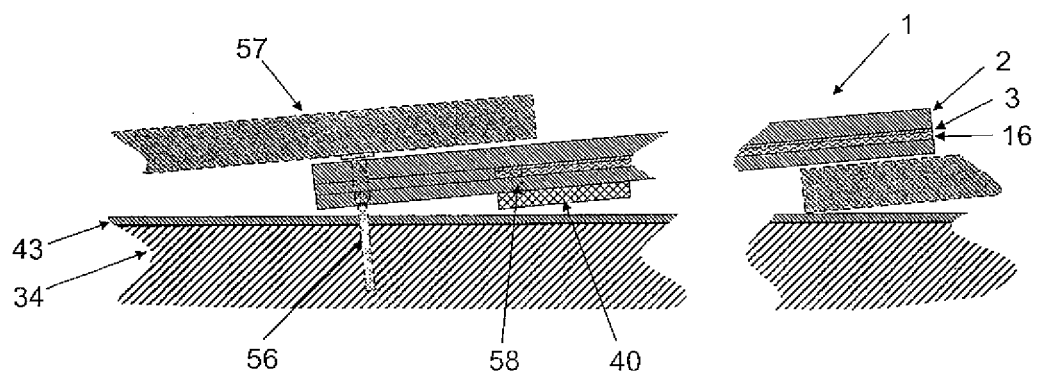
FIG. 16 shows a sectional side view of the FIG. 15 embodiment.

FIG. 16 shows a section view of the decorative element 1 from FIG. 15. As above, the element 1 is installed in a typical manner for shingling with a mechanical fastener 56 attaching to the underlying surface 34 through an underlayment layer 43. The shingle element 1 is created by encasing a light altering material layer 3 within outer protective layers 2. In this case, the form and appearance of a traditional shingle could be closely mimicked by the element 1 having the same dimensions of the traditional shingles 57. The controller 40 is shown hidden in the area beneath the shingle element and the required interconnection 58 passes through the outer protective layer 2. In an additional embodiment, the shingle-type decorative element 1 can become an autonomous unit with the inclusion of an energy harvesting device 16 and an energy storage device (not shown, but possibly included with the controller 40). It is envisioned that the energy harvesting device 16 in this case is a photovoltaic cell and that solar radiation would pass through the light altering material layer 3. However, other energy harvesting devices 16, such as those generating electrical power from movement, chemical reactions, etc., can be used.

Figure 17:
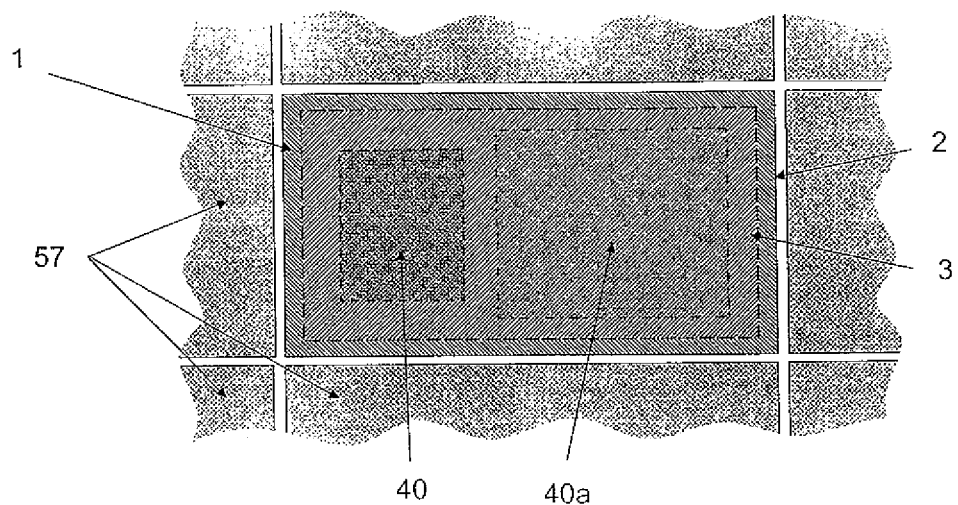
FIG. 17 shows a top view of a decorative element deployed in a brick configuration.

FIG. 17 shows another illustrative embodiment of a decorative element 1 in the form of a brick. The element 1 may be installed in a typical manner among other traditional bricks 57 in a wall or floor. The brick-type decorative element 1 in this case is created by encasing a light altering material layer 3 within outer protective layers 2, 4. Additionally, a controller 40 could be hidden in an area beneath the light altering material layer 3. In an alternative embodiment, the brick element 1 can become an autonomous unit with the inclusion of an energy harvesting device and an energy storage device (not shown in this view).

Figure 18:
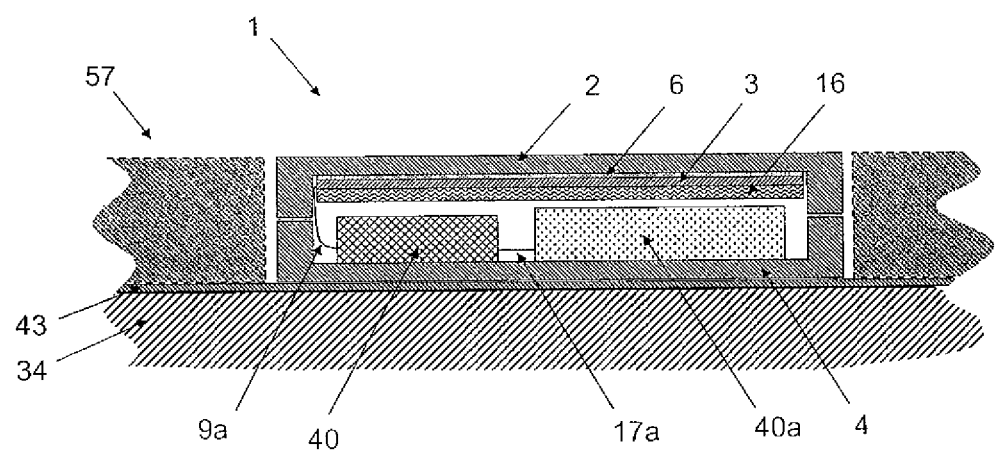
FIG. 18 shows a sectional side view of the FIG. 17 embodiment.

FIG. 18 shows the brick-type decorative element 1 of FIG. 17 in a section view. As above, the element is installed in a typical manner for a brick paver among other traditional bricks 57 bedded on an underlayment layer 43 above the ground 34 or other support. The brick element 1 is created by encasing a light altering material layer 3 within a front outer protective layer 2 and a rear outer protective layer 4. In this case, an additional space is created above the rear outer protective layer 4. In this space, a controller 40 and an energy storage device 40*a* (e.g., a battery or capacitor) may be located along with required interconnections 9*a*, 17*a*. With the inclusion of an energy harvesting device 16, the brick element 1 can become an autonomous unit which could be particularly useful in this form. As above, it is envisioned that the energy harvesting device 16 in this case is a photovoltaic cell, but could take other arrangements. As discussed above, the brick-type decorative element 1 may be arranged to withstand the forces, impacts, abrasion and other environmental conditions common to bricks, particularly those located on a floor.

Figure 19:
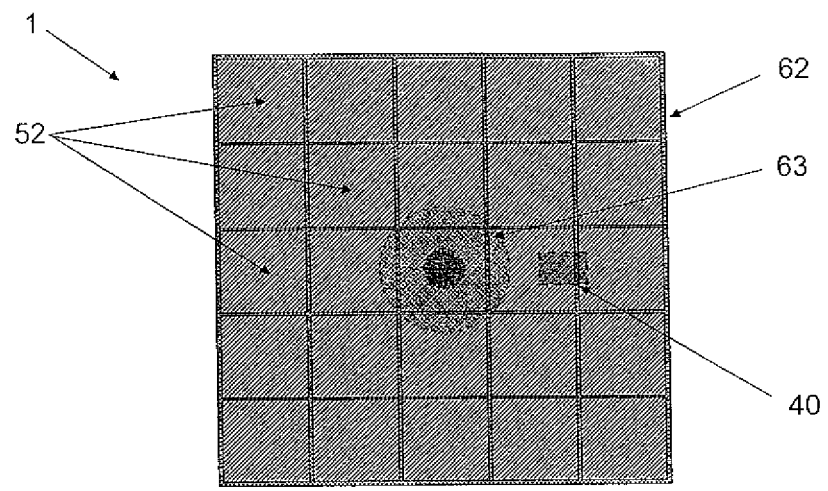
FIG. 19 shows a top view of multiple decorative elements deployed in a table top.

FIG. 19 shows a top view of another embodiment in which a decorative element 1 is arranged in the form of a café table top. Dynamic light altering material regions 52 are shown set within the table surface 62. Depending upon the desired effect, reflective and/or transmissive modes could be employed. The table could be supported by a central pedestal 63 or other suitable support. Beneath or within the table top, a controller 40 may be placed so as to be largely hidden from view. In a further embodiment including energy harvesting and storage devices, the table could function as an autonomous unit.

Figure 20:
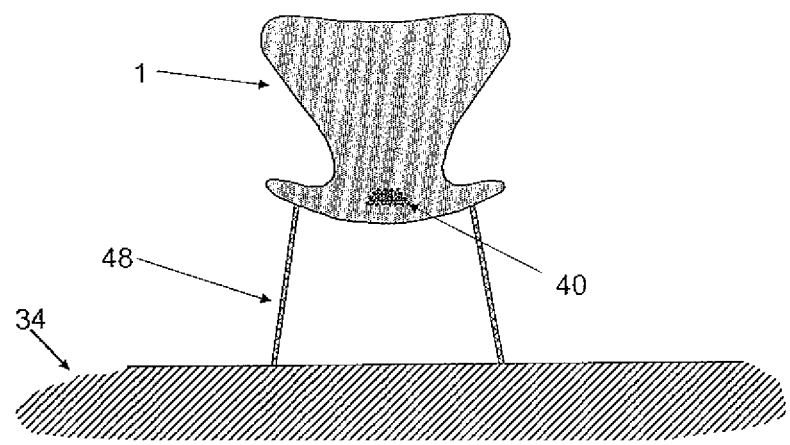
FIG. 20 shows a decorative element deployed as a seating surface.

FIG. 20 shows another embodiment in which a decorative element 1 is arranged as a seating surface of a chair. The element 1 may be shaped a typical chair, e.g., with legs 48 resting on a floor 34. In this case, element 1 is formed from a single piece into a chair with a continuously curved seat and back, but may be arranged in other ways, such as having distinct seat and back portions. A controller 40 may be placed beneath the seat or otherwise so as to be largely hidden from view. In a further embodiment including energy harvesting and storage devices, the chair could function as an autonomous unit.

D. Element with Ability to be Cut, Sawed, Drilled, Woven, Molded, . . .

A further aspect of the invention is the ability of a decorative element to undergo a mechanical operation to change its form in a manner similar to other building materials. Such mechanical operations could include cutting, sawing, drilling, scoring, partial layer removal, molding, etc. to effect permanent change in decorative element. For example, an element could have several holes drilled through it to allow for mounting. These holes could be drilled directly through the light altering material sections without a loss of functionality. Further, an element could be cut and/or then bent to form a complex 3D shapes while maintaining dynamic properties to generate multiple visual appearances.

Figure 21:
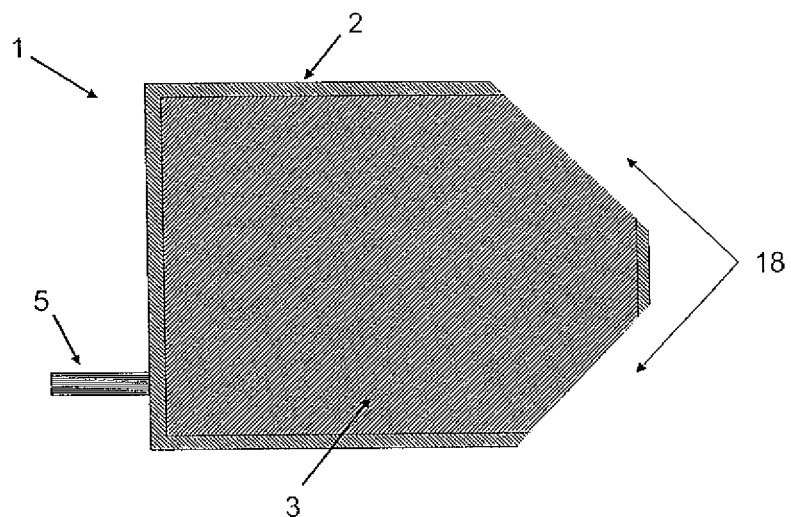
FIG. 21 shows a schematic view of a decorative element after a mechanical operation to alter the element's shape.

For example, FIG. 21 shows a decorative element 1 that includes a light altering material layer 3 within outer protective layers 2. The light altering material layer 3 may be electrically connected to a controller (not shown) by interconnection 5 so as to control the appearance state of the element 1. In this embodiment, the assembled element has undergone a mechanical operation by the cutting away of two regions 18. Note the cutting has included part of the light altering material layer 3. The element 1 may retain its functionality by way of several possible mechanisms. For example, the light altering material 3 and other components of the element 1 may be made in a solid form such that cutting away portions of the element 1 does not cause the release of such material (as would be the case with a standard LCD display) or otherwise permanent damage to the device. In other embodiments, the light altering material 3 may be encased in cells, compartments or other arrangements so that cutting, drilling, etc. may damage one or more cells, yet permit remaining cells to function properly.

Figure 22:
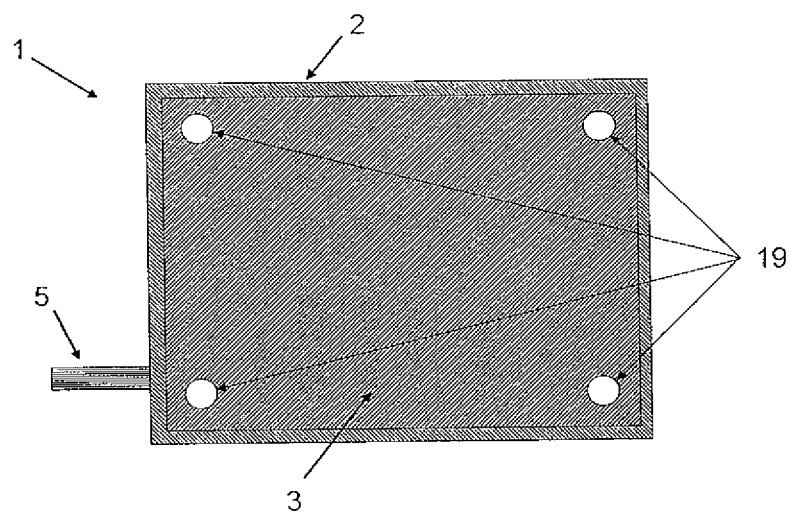
FIG. 22 shows a schematic view of a decorative element after a mechanical operation to form holes in the element.
Figure 23:
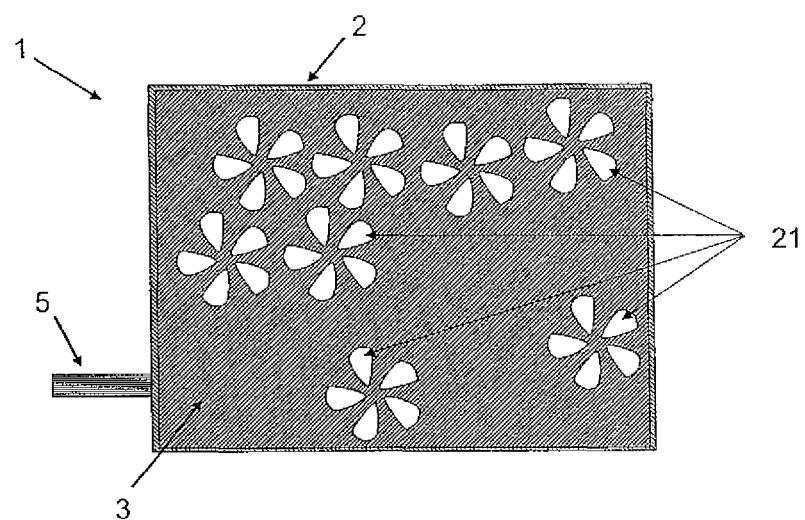
FIG. 23 shows a schematic view of a decorative element after a mechanical operation to form decorative forms in the element.

FIG. 22 shows another a decorative element 1 that has undergone a mechanical operation by the drilling of holes 19. Note the drilling has included part of the light altering material layer 3. These holes 19 may be used to physically support the element 1, e.g., on a wall, to reveal visual elements located behind the element 1, and/or for any other suitable reason. For example, FIG. 23 shows a decorative element 1 having holes to form decorative patterns 21, e.g., made by a mechanical punching operation. Note the punching has included part of the light altering material layer 3.

Figure 24:
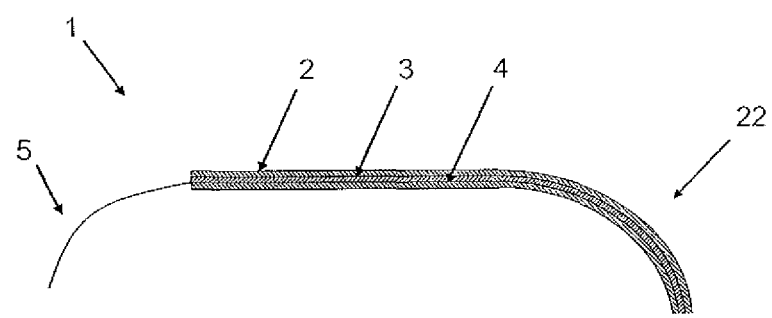
FIG. 24 shows a schematic view of a decorative element after a mechanical operation to change the 3-dimensional shape of the element.
Figure 25:
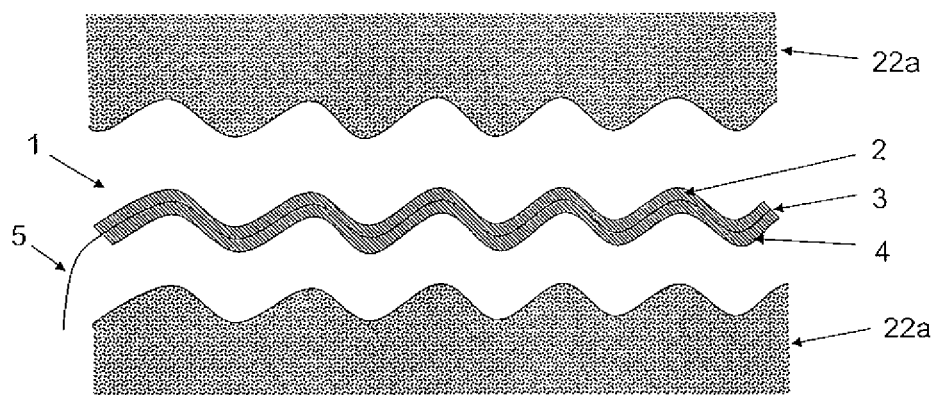
FIG. 25 shows a schematic view of molding process to permanently form a 3-dimensional shape in a decorative element.
Figure 26:
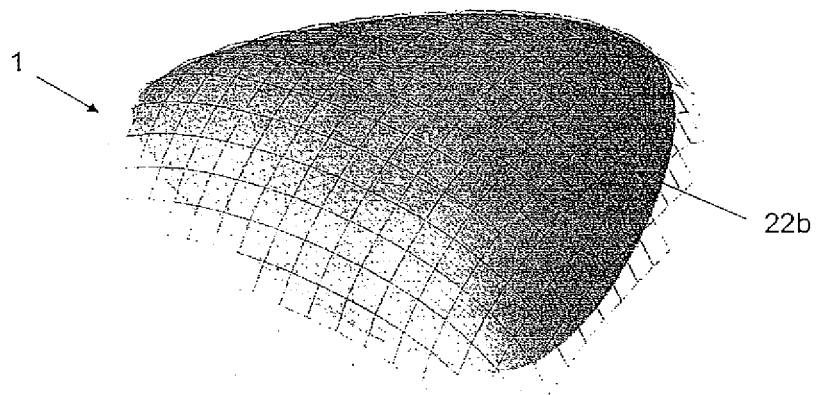
FIG. 26 shows an illustrative 3-dimensional shape that may be formed by a decorative element.

FIG. 24 shows a decorative element 1 that has undergone a mechanical operation by the bending of a portion 22 of the element. Note the bending has included part of the light altering material layer 3. The element 1 may elastically and/or plastically resist the bending operation such that the element 1 may recover (partially or completely) to a starting shape upon release of the bending forces. In another embodiment, the element 1 may be molded to permanently take a bent or otherwise deformed state relative to a starting shape (e.g., a flat sheet form). For example, FIG. 25 shows a decorative element 1 that has undergone a mechanical operation of molding by which the element 1 is permanently formed into a complex 2D (or 3D) shape defined by a mold 22*a*. Molding may be done by heating the element 1 to a suitable temperature before and/or after applying physical molding force by press, rolling or otherwise. This aspect of the invention is not limited to any particular shape, and FIG. 26 shows an illustrative complex 3D shape for a decorative element. Depending on the desired shape, different mechanical operations could be employed, including: using complex computer generated forms 22*b*, thin profile elements, and elements created from strips or other geometric units. This embodiment is intended to indicate that almost any form might be created and that CAD design tools and CNC type tooling could be readily applied.

E. Element as Part of Autonomous System

A further aspect of the invention is the ability of a decorative element to be configured to not require any connection to an external power or control source. This "autonomous operation" configuration could be very useful in remote installations, temporary installations, or those requiring frequent rearrangement, among others. In the first case, one could use decorative elements 1 in a hanging mobile or other kinetic application requiring free movement. The second case, one could quickly install a series of elements in an atrium for a promotional activity without having to run expensive and/or unsightly wiring. Finally, outdoor furniture, like café tables that need to be moved and stored periodically could benefit from not having to plug in to an electrical power source, yet still have the ability to change visual appearance on demand, randomly, or at some other control.

Another variation on this capability is shown in some of the building components (like shingles and bricks) in the previous section. For these formats to achieve the usability of their traditional analogs, the decorative element 1 should also be stand alone units without specialized wiring. In this way, a mason could have a stack of autonomous dynamic decorative element brick next to other standard bricks and simply include the brick-type decorative elements in a wall as the design indicates without any special equipment or other trade's involvement.

The most likely embodiment of such decorative elements 1 may include integrated photovoltaic cells as an energy source, an energy storage device, such as a battery, and a special low power controller. The solar cell approach is well suited to this application as most installations will be in areas of moderate to high ambient lighting, up to and including direct sun light (particularly because the decorative elements 1 are not light-emitting). Other energy harvesting methods are also possible. Further, as most of the light altering methods envisioned (including the PIPS cholesteric embodiment) do not consume power unless they are changing visual appearance states, the decorative elements 1 may have a very low average power consumption that is compatible with small integrated solar cells. Finally, if the stored power became depleted, the dynamic element could simply stay in its current state until additional charging took place. Thus, due to its non-emissive nature, the decorative element 1 would not "go out" or fail to have at least some visual appearance.

The controller of such an autonomous system could operate in several different ways. In one example, the controller could play through a timed sequence of visual appearance states without any other inputs. In another case, the controller could respond to input from an integrated sensor (e.g., detecting motion, $CO_2$ levels, temperature, time of day, etc.) and cause the element(s) to change accordingly. In another case, the controller has wireless communication capability and could thus adopt some combination of the previous modes as well as be controlled remotely as part of a larger system. For example, a decorative element or collection of elements may receive wireless control signals from a "clicker" or other handheld control device, allowing a user to selectively set the appearance state for the element(s).

Figure 27:
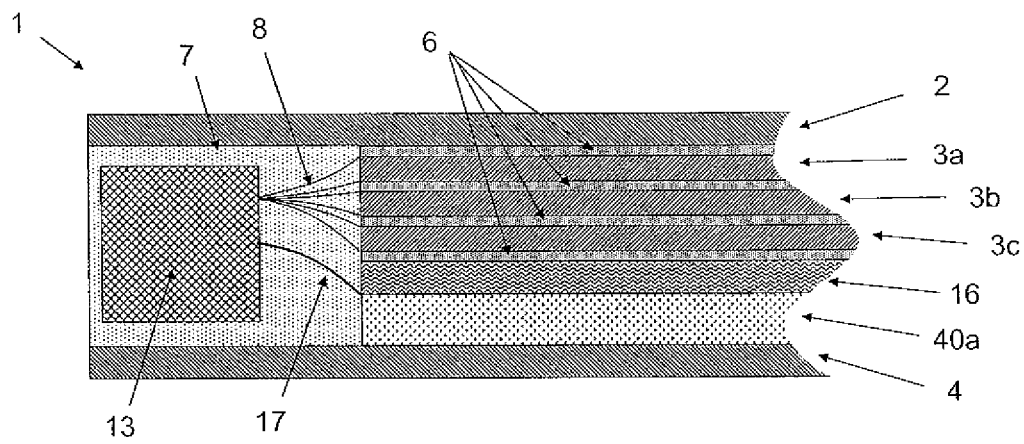
FIG. 27 shows a schematic side view of a decorative element with integrated energy harvesting device and energy storage device in an illustrative embodiment.

FIG. 27 shows an edge of a decorative element 1 constructed with multiple light altering layers 3a, 3b, 3c within covering material layers 6. This assembly is further encased by a front outer protective layer 2 and a rear outer protective layer 4. The light altering material layers 3a, 3b, 3c are electrically connected to a specialized element controller 13 by interconnections 8. In this embodiment, the element may be used as an autonomous unit due to the inclusion of an energy harvesting device 16 and an energy storage device 40a. It is envisioned that the energy harvesting device 16 in this case is a photovoltaic cell that is connected with an energy storage device 40a to the specialized controller 13 by interconnect 17. An adhesive 7 may be used to secure the interconnections 8, 17 and controller 13 as well as seal the edge of the element 1. In an optional configuration, the element controller 13 may be connected to a higher level system control using wireless communication. Another option could include a sensor(s) to help govern the control of the element 1.

FIG. 16 and FIG. 18 (previously discussed) show other embodiments of potential autonomous units.

F. Method to Control Using Color Chip System

One aspect of the invention is to enable design professionals (architects, interior decorators, industrial designers, furniture makers, etc.) to use the decorative elements in a way in which they are already familiar when choosing paint or other building materials. When specifying material and color choices, designers are accustomed to being able to see (and handle) physical samples. Another aspect of the invention enables this sort of familiar experience with the dynamic decorative elements, both before the decorative elements are deployed (as is the case when choosing paint or other traditional, passive materials) and after the decorative elements are deployed (which is impossible with passive materials, unless the materials are removed and/or replaced).

In one embodiment, a set of physical "paint chips" or other color samples formed by a solid material or a painted surface on a carrier may be created to show the possible dynamic color choices for decorative elements 1. The designer could thus examine the options and compare them to other traditional material samples in order to reach a decision about what colors to employ with the dynamic elements. Such decisions could be made after one or more decorative elements have been deployed, e.g., where the designer wishes to change the visual appearance(s) that the decorative element(s) exhibit in one or more modes, or prior to deploying the decorative element(s). Use of the "color chip" system could provide a more accurate representation of the actual aesthetic of the dynamic elements due to the same color experience of the observer (i.e., a reflective color sensation as opposed to the emissive (or backlit) nature of the computer monitor.) Practically, this is also a technique to present the available palette, realizing that all colors shown on a computer monitor may not be achievable in the element—just as all computer images cannot be printed accurately due to differences between the devices' color gamuts and other variations. The color chips could be calibrated to provide a reasonably accurate representation of the decorative elements' actual color characteristics. Further, the chips could also have the same sort of surface treatment (shiny, matte, frosted, etc.) that is being specified for the actual installation. More generally, the color chips could include any passive aesthetic elements or components that the user feels are important to give an accurate representation. These chips could be created using a number of methods, including: printing, painting, pigmented films or actual light altering material left in a particular state. Finally, they may be designed to represent a reflective system, a transmissive system or both.

Normally, the decorative elements are configured to be controlled to present a plurality of different visual appearances, e.g., all of the colors or other appearance types in a set of color chips. Thus, a deployed decorative element could be controlled in different ways to present different visual appearances. For example, a decorative element may be controlled to present a particular visual appearance during winter days and another visual appearance during winter nights. Once spring arrives, a designer may wish to change the visual appearance of the decorative element during day and night. To do so, the designer may select an appearance from a set of color chips, one for day and another for night. The decorative element controller may then be provided with suitable control signals so as to replace the winter day/night visual appearances with the new spring day/night visual appearances. In another embodiment, the decorative elements could be specially configured to present only a limited number of visual appearances. For example, before a decorative element is deployed, a designer may select two or more visual appearances and based on the selected appearances, the decorative element may be specially programmed or otherwise made or configured to present only the selected visual appearances.

Choices of decorative element visual appearances could be made using a simple and intuitive computer interface to allow the designer to pick among options on the screen that correspond to the physical "chips." For example, the physical chips could have a number or other identifier that could be entered into or selected on the computer user interface. This interface could also show a "visualizer" mock-up of the decorative element layout that would represent the color choices as they are made. (Again, although the term "color choice" is used, this refers to a choice of visual appearance, which may include a color component as well as surface texture, etc.) This might be particularly useful where several different decorative elements are to be used in an area, and the decorative elements are arranged to coordinate with adjacent passive materials and/or each other. Thus, for example, a designer could create a layout of several decorative elements together with passive materials of any desired shape or configuration on a computer. The visual appearances for the decorative elements could be selected based on the color chip identifications, and then displayed on the computer. Once a set of choices was complete, the visualizer could play through the chosen sequence for review. In this way, the control system of the invention could combine the advantages of both tangible materials and virtual imagery.

Once the selection process is complete, the user interface could generate and send suitable control signals to a controller for a set of deployed decorative elements so as to change the control arrangement to provide the newly selected visual appearances, or in the case that selections are made before deployment, the user interface could generate and provide a detailed listing of the decorative elements, their various passive aesthetic element details and other construction and/or programming information, as needed.

Figure 28:
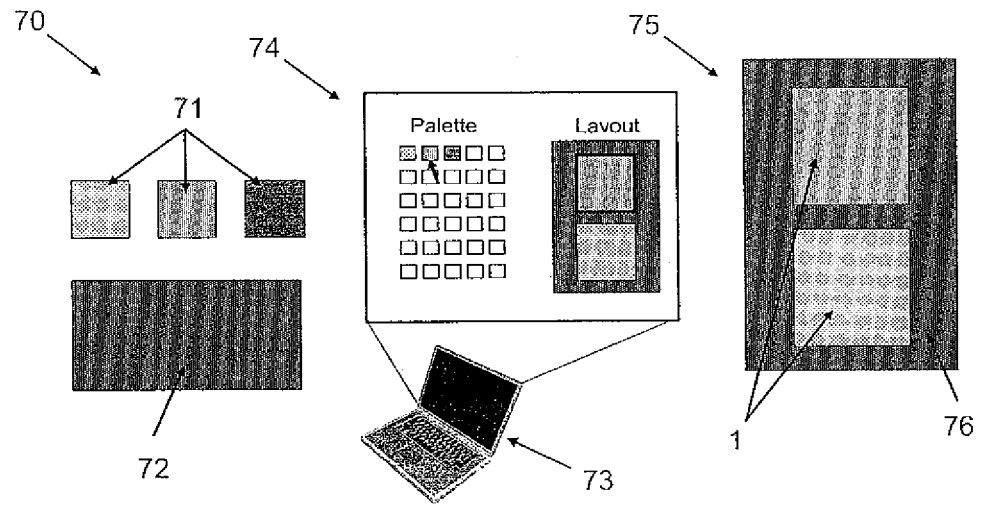
FIG. 28 shows a schematic view of a color chip system in accordance with an aspect of the invention.

FIG. 28 shows an illustrative embodiment of a color selection system 70. Although the terms "color selection" and "color chip" are used, it should be understood that the system 70 may be used to select any feature of visual appearances for a decorative element, such as surface finish (matte, gloss or other), color, degree of opacity or translucency, size, shape or other configuration of aesthetic elements (such as embedded materials), and so on. Once provided with a set of physical color chips, a user may examine the color chips 71 that represent potential color states or other visual appearance characteristics of the decorative elements 1. The color chips 71 may be compared to a sample 72 of a traditional material (such as stone, wood, brick, etc.) to enable aesthetic coordination. When a choice is made, the selection can be entered in the system through a user interface 74 as part of specialized software operating on a computer 73. In particular, the user interface 74 may show a palette of possible color choices that correspond to the physical paint chips 71 and a virtual layout that could be set to correspond to the user's desired application 75. As an example, the user interface 74 could operate much like Microsoft Paint or a similar program that allows the user to define the shape and relative size of decorative elements, as well as define the visual appearance of the elements from a multi-choice palette and the location of decorative elements in a layout, e.g., with other passive building materials. As selections are made, the virtual layout may change to represent those selections. The user interface 74 could also be operated to change the visual appearance state of the decorative elements 1 according to the defined scheme, helping the designer to visualize the effects of the different visual appearance states. The system 70 could thus enable an accurate representation of both the dynamic elements 1 and the traditional material 76 as they may be configured in an actual application 75, such as tile-type decorative elements 1 and traditional tiles 76 in a floor layout application 75. This may enable a user to control the new dynamic material in a relatively familiar and accurate manner.

G. Overlapping Decorative Elements

In another embodiment of the invention, some portions of a decorative element could physically overlap one another to provide a visual appearance in the overlapping areas that is contributed to by both of the decorative elements. For example, two overlapping portions may each have their own respective color (e.g., blue and yellow), providing a combined appearance (a green color) in the overlapped region. In another example, applicable elements could be "woven" together to create a series of multiple overlapping regions. This "lattice" type arrangement could be visually compelling.

Figure 29:
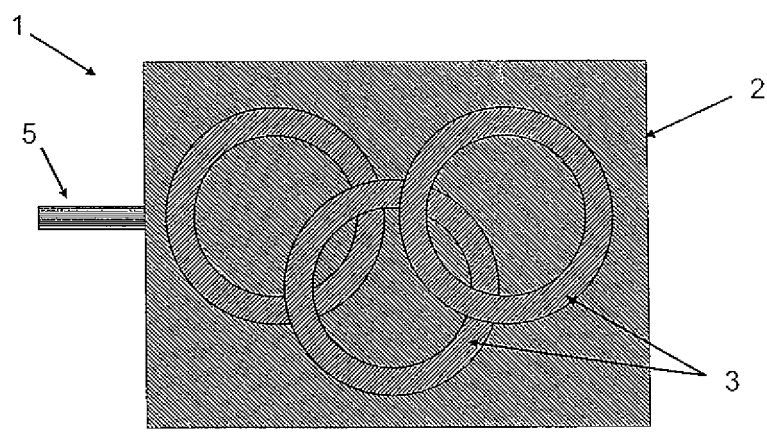
FIG. 29 shows a top view of a decorative element having overlapping light altering material layers.

FIG. 29 shows a decorative element 1 created so that the light altering material layer regions 3 overlap one another in a desired manner (in this case, to give the appearance of overlapping rings). In the overlapping regions, the visual appearance could include contributions from both light altering material layers. The resulting effect would depend on which mode (reflective and/or transmissive) was employed.

Figure 30:
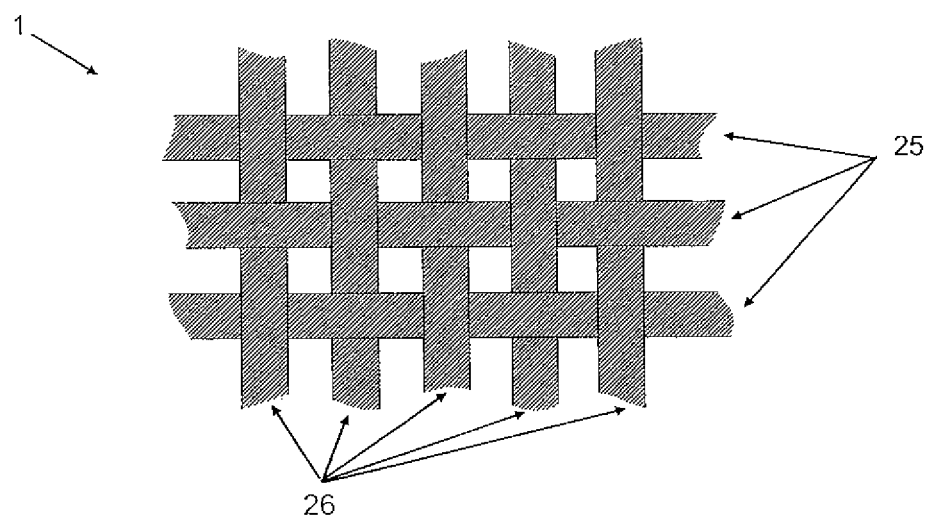
FIG. 30 shows a schematic view of an arrangement with multiple, woven decorative elements.

FIG. 30 shows an embodiment in which multiple decorative elements are woven together. This assembly consists of strip like decorative elements running in a horizontal direction 25 woven together with strip-like decorative elements running in a vertical direction 26. In this embodiment, the woven elements 25, 26 create a visually compelling system regardless of the scale of the elements. In the overlapping regions, the visual appearance could include contributions from both elements. As above, the resulting effect would depend on which mode was employed; however, the transmissive mode may hold the greater promise for such a configuration.

The invention claimed is:

1. A building material having multiple selectable visual appearance capabilities, comprising:
   at least one decorative element including:
      at least one layer of light altering material arranged to selectively transmit, absorb or reflect light in a wavelength range, the at least one layer of light altering material including an encapsulated cholesteric liquid crystal material produced using a polymerization induced phase separation (PIPS) technique, an encapsulated electrowetting device or an encapsulated photonic crystal device;
      at least upper and lower layers of covering material arranged to cover upper and lower sides, respectively, of the at least one layer of light altering material, the upper and/or lower layer of covering material including an electrode arranged to expose light altering material to an electric field and thereby control the light altering material to selectively transmit, absorb or reflect light in the wavelength range;
      a first outer protective layer arranged over the upper layer of covering material;
      a second outer protective layer arranged over the lower layer of covering material; and
      a controller that electrically communicates with the electrode and provides a control signal to the electrode to create the electric field and cause the light altering material to generate a visual appearance in a display area;
   wherein the decorative element is arranged to controllably provide five or more stable, differently colored visual appearances at each of one or more pixels, wherein the five or more stable, differently colored visual appearances are each their own respective color within the visual spectrum, and being exhibited at the one or more pixels without requiring application of electrical power to the one or more pixels, each pixel having a size of at least 1 inch by 1 inch, and the decorative element is arranged to function as an exposed durable construction material.

2. The building material of claim 1, wherein the decorative element is an exposed durable construction material for a floor, wall, stair, ceiling, curtain wall system, counter, chair or table, or is part of a floor covering, a table top, a wall, a stair tread or a decorative molding.

3. The building material of claim 1, wherein the light altering material is an encapsulated cholesteric liquid crystal material.

4. The building material of claim 1, wherein the decorative element includes a passive aesthetic component permanently arranged with one of the outer protective layers or fixed between the outer protective layers, the passive aesthetic component being visible from at least one side of the decorative element; and wherein the controller is arranged to provide suitable control signals so that the decorative element creates a corresponding visual appearance that includes visual components provided by the passive aesthetic component and the light altering material.

5. The building material of claim 4, wherein the passive aesthetic component includes grooves, cuts, embossing, etching, printed images or embedded materials in a surface of an outer protective layer.

6. The building material of claim 5, wherein the decorative element includes embedded materials permanently arranged with one of the outer protective layers or fixed between the outer protective layers, the embedded materials including wire, grass, wood, twigs, leaves, flowers, shells, rocks or fibers.

7. The building material of claim 4, wherein the passive aesthetic component masks an electrical interconnection to an electrode on the covering material.

8. The building material of claim 1, comprising first and second decorative elements that each have respective first and second element portions that are fixed relative to each other such that the first and second element portions overlap, the overlapping first and second element portions providing a visual appearance that includes a contribution from both of the first and second element portions.

9. The building material of claim 8, wherein the overlapping first and second element portions transmit, absorb or reflect a unique color, and the visual appearance includes both colors.

10. The building material of claim 8, wherein the visual appearance provided by the overlapping first and second element portions is created by light transmitted through the overlapping first and second element portions.

11. The building material of claim 1, wherein the controller is arranged to control the decorative element to produce a visual appearance to mimic an adjacent passive construction material, the passive construction material including a painted surface or a natural surface, wherein the natural surface includes a metal surface, a wood surface, a plastic surface, a stone surface, a tile surface or a glass surface.

12. The building material of claim 1, wherein the decorative element is arranged to provide a visual appearance based on light reflected from the light altering material.

13. The building material of claim 1, wherein the decorative element is arranged to provide a visual appearance based on light transmitted by the light altering material.

14. A decorative element comprising:

at least one layer of light altering material arranged to selectively transmit, absorb or reflect light in a wavelength range, the at least one layer of light altering material including an encapsulated cholesteric liquid crystal material produced using a polymerization induced phase separation (PIPS) technique, an encapsulated electrowetting device or an encapsulated photonic crystal device;

at least upper and lower layers of covering material arranged to cover upper and lower sides, respectively, of the at least one layer of light altering material, the upper and/or lower layer of covering material including an electrode arranged to expose light altering material to an electric field and thereby control the light altering material to selectively transmit, absorb or reflect light in the wavelength range;

a first outer protective layer arranged over the upper layer of covering material;

a second outer protective layer arranged over the lower layer of covering material;

a controller that electrically communicates with the electrode and provides a control signal to the electrode to create the electric field and cause the light altering material to generate a visual appearance in a display area;

wherein the layer of light altering material, the layers of covering material and the protective layers are arranged to allow permanent physical alteration of one or more portions of the layers by mechanical operation, and wherein the decorative element is functional to controllably provide five or more stable, differently colored visual appearances at each of one or more pixels, wherein the five or more stable, differently colored visual appearances are each their own respective color within the visual spectrum, and being exhibited at the one or more pixels without requiring application of electrical power to the one or more pixels, each pixel having a size of at least 1 inch by 1 inch, before and after the physical alteration of one or more portions of the layers.

15. The decorative element of claim 14, wherein the mechanical operation includes drilling, cutting, or molding the layers to take on a different permanent physical shape.

16. The decorative element of claim 14, wherein the decorative element is arranged to function as an exposed durable construction material for a floor, wall, stair, ceiling, curtain wall system, counter, chair or table.

17. The building material of claim 1, wherein the controller is arranged to control the decorative element to produce a visual appearance that corresponds to one of a plurality of selectable colors.

18. The building material of claim 17, further comprising a plurality of color chips and wherein the plurality of selectable colors each correspond to one of the plurality of color chips.

19. The building material of claim 1, wherein electrical connections between the controller and the electrode of the decorative element are formed by printing.

20. The building material of claim 1, wherein the at least one layer of light altering material, the upper and lower layers of covering material, and the first and second outer protective layers are formed to have a customized 3-dimensional shape and function as an exposed part of a brick, a shingle, a tile, a floor covering, a wall, a stair tread, a countertop, a chair, or a table.

* * * * *